United States Patent [19]

McClanahan et al.

[11] Patent Number: 4,841,429
[45] Date of Patent: Jun. 20, 1989

[54] CAPACITIVE COUPLED POWER SUPPLIES

[75] Inventors: Robert F. McClanahan, Valencia; Robert D. Washburn, Malibu; Carlos H. Gonzalez, Norwalk; Jerry C. Sze, San Francisco; David M. Lusher, Torrance, all of Calif.

[73] Assignee: Hughes Aircraft Company, Los Angeles, Calif.

[21] Appl. No.: 173,223

[22] Filed: Mar. 24, 1988

[51] Int. Cl.$^4$ .................................. H02M 7/06
[52] U.S. Cl. .................................. 363/126; 363/70
[58] Field of Search ............... 363/44, 65, 67, 68, 363/69, 70, 125, 126

[56] References Cited

U.S. PATENT DOCUMENTS

| | | | |
|---|---|---|---|
| 3,001,120 | 9/1961 | Bereskin | 363/126 |
| 3,505,608 | 4/1970 | Enge | 328/233 |
| 3,543,136 | 11/1970 | Enge | 363/61 |
| 3,596,167 | 7/1971 | Enge | 363/61 |
| 4,084,217 | 4/1978 | Brandli et al. | 363/67 |
| 4,393,441 | 7/1983 | Enge | 363/126 |
| 4,412,278 | 10/1983 | Cambier et al. | 363/126 |

Primary Examiner—Peter S. Wong
Attorney, Agent, or Firm—Leonard A. Alkov; A. W. Karambelas

[57] ABSTRACT

A rectifying power supply having circuitry for providing AC power, a plurality of capacitors responsive to the AC power for providing DC isolation and for providing capacitively coupled AC power, and a plurality of rectifying circuits responsive to the capacitively coupled AC power for providing respective DC outputs. The outputs of the rectifying circuits are coupled in series or in parallel.

7 Claims, 2 Drawing Sheets

CAPACITIVE COUPLED POWER SUPPLIES

BACKGROUND OF THE INVENTION

The disclosed invention is generally directed to rectifying power supplies, and is more particularly directed to a high frequency rectifying power supply which does not utilize a complex transformer.

Rectifying power supplies are utilized in certain applications where the required supply voltage is DC. The originating power source may provide an AC voltage or a DC voltage. With a DC voltage supply, stepping the voltage up or down requires conversion of the DC power to AC power which may be accomplished, for example, with a square wave converter or a sinewave converter. Typically, the AC voltage is generally stepped up or stepped down as required by a transformer, and then rectified.

Significant improvements in the size and weight of rectifying power supplies have been made by increasing the operating frequency of the AC power. Particularly, higher operating frequencies allow for significantly smaller capacitive elements. However, operating frequencies have been limited by certain considerations including the increase of transformer size with frequency, and the inability of known transformer designs to operate at frequencies greater than one MHz. Particularly, with increased AC operating frequencies, transformer isolation is reduced, reflections increase, and core losses increase. As a result of problems encountered with increased frequencies, different transformer designs have been made in attempts to allow for higher AC operating frequency operation. Such designs, however, are complex and generally require time-consuming and costly development for particular applications. Moreover, such transformer designs do not provide significant increases in AC operating frequencies, and moreover are bulky.

A further consideration in the implementation of high frequency power supplies is the power handling limits of available diodes. If the number of secondary windings is reduced in attempting to make transformers smaller and less complex, then the power limits of available diodes may be exceeded. If more secondary windings are used to accommodate the power limits of available diodes, then transformer complexity and size increase.

SUMMARY OF THE INVENTION

It would therefore be an advantage to provide a high frequency rectifying power supply which does not utilize a complex and bulky transformer.

It would also be an advantage to provide a high frequency rectifying power supply which has an AC operating frequency of greater than 1 MHz.

Another advantage would be to provide a rectifying power supply having an AC operating frequency of greater than 1 MHz which does not utilize a complex and bulky transformer.

The foregoing and other features are provided by the invention in a power supply which includes circuitry for providing AC power, a plurality of capacitors responsive to the AC power for providing DC isolation and for providing capacitively coupled AC power, and a plurality of rectifying circuits responsive to the capacitively coupled AC power for providing respective DC outputs.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
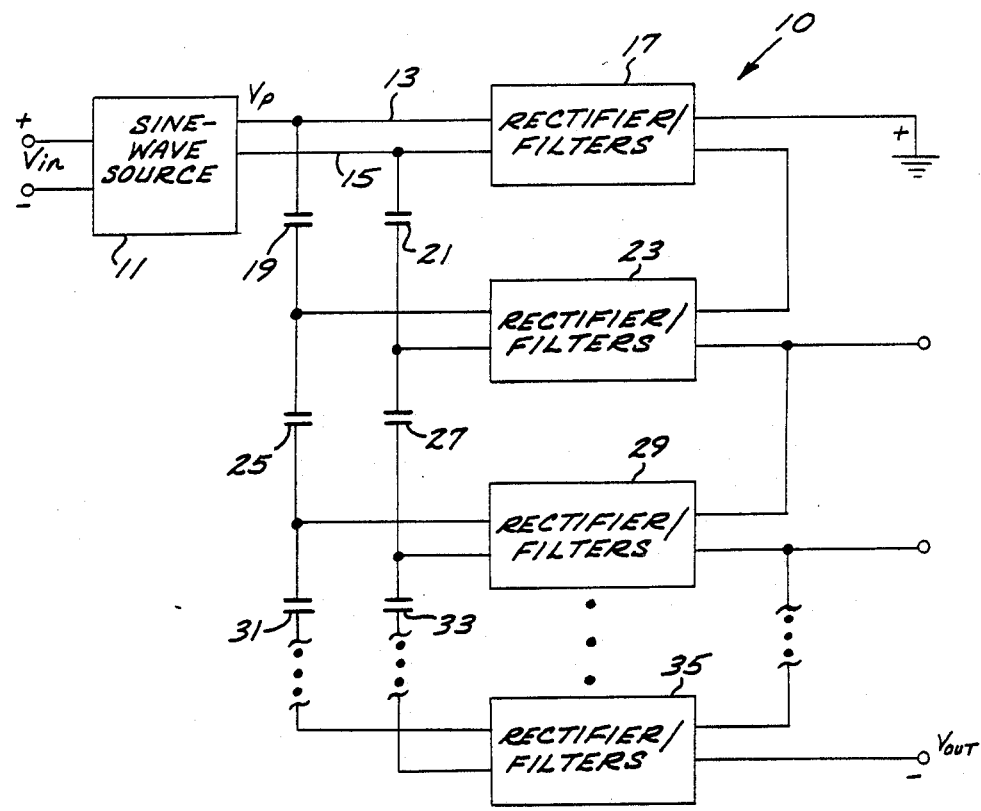
FIG. 1 is a block diagram of a rectifying power supply in accordance with the invention wherein the outputs of the power supply rectifier/filter modules are serially coupled.

In the following detailed description and in the several figures of the drawing, like elements are identified with like reference numerals.

Referring now to FIG. 1, illustrated therein is a high frequency rectifying power supply 10 which includes a sinewave source 11 that is responsive to a DC supply voltage $V_{in}$. By way of example, $V_{in}$ may be 200 volts. The sinewave source 11 can comprise known circuitry for converting a DC voltage to an AC voltage that varies sinusoidally. Alternatively, a square wave source may also be utilized. By way of more specific example, the sinewave source 11 may also include a low ratio transformer for providing transformer isolation and, if appropriate, a relatively small step-up or step-down in voltage. The ratio of such isolation transformer can range from (5:1) to (1:5).

The output of the sinewave source 11 has a peak voltage denoted $V_p$ and is coupled via output lines 13, 15 to a rectifier/filter module 20. The rectifier/filter module 20 may be of conventional design for providing full wave rectification and filtering to provide a DC voltage output. A conventional example of circuitry for the rectifier/filter module 20 is discussed further herein in conjunction with FIG. 2.

Coupling capacitors 19, 21 have first terminals respectively coupled to the output lines 13, 15. The second terminals of the coupling capacitors 19, 21 are coupled to the input of a rectifier/filter module 23, which may be of the same circuit structure as the rectifier/filter module 17.

The second terminals of the coupling capacitors 19, 21 are further coupled to the first terminals of coupling capacitors 25, 27. The second terminals of the coupling capacitors 25, 27 are coupled to the input of a rectifier/filter module 29, which may be of the same circuit structure as the rectifier/filter modules 17, 23 discussed above.

The second terminals of the coupling capacitors 25, 27 are further coupled to the further coupling capacitors 31, 33. The second terminals of the coupling capacitors 31, 33 are coupled to an associated rectifier/filter module (not shown).

As shown in FIG. 1, N rectifier/filter modules may be utilized, the rectifier/filter module 35 being the $N^{th}$ module, with all of the rectifier/filter modules having associated coupling capacitors, except for the first one, which in this case is identified with the reference numeral 17. In essence, a pair of coupling capacitors is associated with each of the rectifier/filter modules that are in addition to the first rectifier/filter module 17. Such coupling capacitors are interposed between the inputs to the different rectifier/filter modules and are serially coupled.

As also shown in FIG. 1, the outputs of the rectifier/filter modules are connected serially to provide a maximum output voltage that is the sum of the respective output voltages. As discussed further below with respect to FIG. 2, the outputs of the rectifier/filter modules can be across respective output capacitors, and with such structure, the output capacitors of the rectifier/filter modules would be coupled serially. As indicated in FIG. 1, the first terminal of the output capacitor of the rectifier/filter module 17 is coupled to a common reference potential, which may be considered ground. All output voltages are with respect to such common reference potential. The second terminal of the output capacitor of the rectifier/filter module 17 is connected to the first terminal of the output capacitor of the rectifier/filter module 23, and so forth. The second terminal of the $N^{th}$ rectifier/filter module 35 provides a high voltage output which is the sum of the outputs of all of the rectifier/filter modules. The third rectifier/filter module 29 provides an output voltage which is the sum of the outputs provided by it and the preceding rectifier/filter modules. The outputs respectively provided by the second and first rectifier/filter modules should be readily evident.

Assuming small losses in the coupling capacitors, the output voltage $V_{out}$ provided at the $N^{th}$ rectifier/filter module 35 is approximately two-thirds of N times the peak voltage $V_p$ provided by the sinewave source 11.

It should be noted that the increase in the equivalent series resistance of the coupling capacitors provides a limit on the number o rectifier/filter modules that can be utilized in the power supply 10. For example, for an AC operating frequency greater than 1 MHz and an input voltage of 200 volts, it has been determined that 20-30 rectifier/filter modules appears to be a reasonable upper limit with the circuit structure of the FIG. 1. A greater number may result in unacceptable open loop regulation, while in a closed loop system the variation would have to be absorbed in the dynamic range of the power supply 10. Further, high equivalent series resistance results in high power dissipation, which results in shorter component lifetimes. An alternate configuration that addresses these considerations is discussed further herein relative to FIG. 3.

Figure 2:
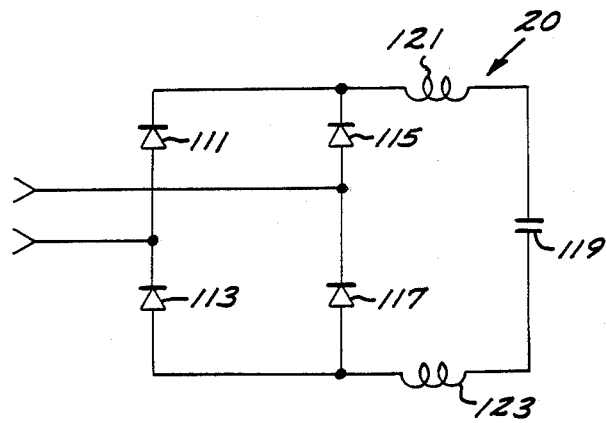
FIG. 2 is a schematic diagram of a rectifier/filter module which may be used in the power supply of FIG. 1.

Referring now to FIG. 2, illustrated therein is a schematic of a rectifier/filter module 20 which may be utilized in the power supply 10 of FIG. 1. Specifically, the rectifier/filter module 20 includes a first pair of serially connected diodes 111, 113 in parallel with a second pair of serially connected diodes 115, 117. A pair of balanced inductors 121, 123 are connected in series with the diode pairs, and function to ensure continuous operation of the diodes 111, 113, 115, 117. A smoothing capacitor 119 is connected in series with the balanced inductors 121, 123. The output of the rectifier/filter module 20 is across the smoothing capacitor 119.

Figure 3:
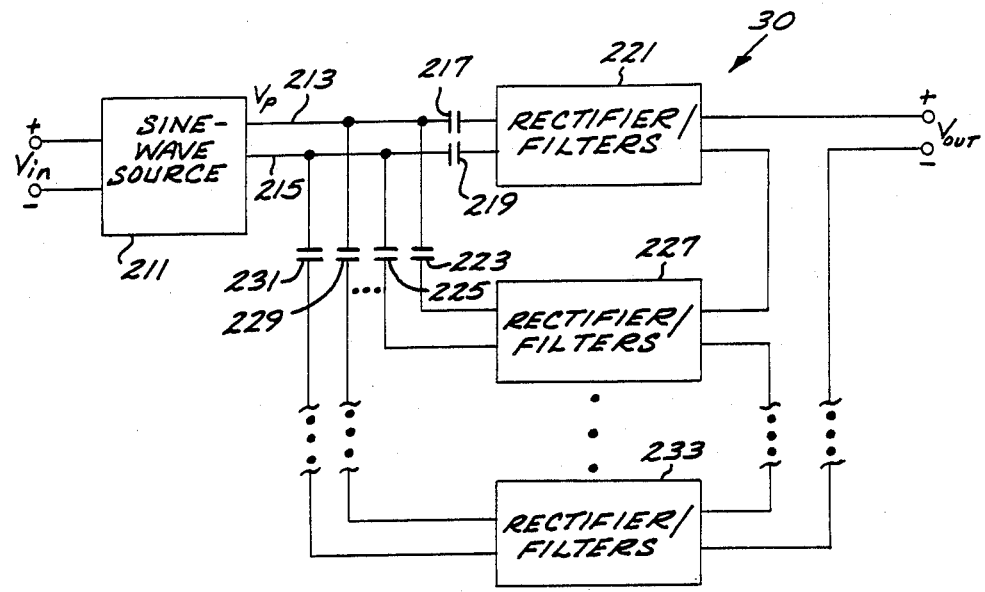
FIG. 3 is a block diagram of further rectifying power supply in accordance with the invention.

Referring now to FIG. 3, a high voltage rectifying power supply 30 includes a sinewave source 211 which is responsive to a DC input voltage $V_{in}$, which by way of example may be 200 volts. The output of the sinewave source 211 has a peak voltage denoted $V_p$ and is on output lines 213, 215. The first terminals of coupling capacitors 217, 219 are coupled to the sinewave source output lines 213, 215. The second terminals of the capacitors 217, 219 are connected to the input of a rectifier/filter module 211, which may be of conventional design such as the rectifier/filter module 20 of FIG. 2.

The first terminals of coupling capacitors 223, 225 are respectively coupled to the output lines 213, 215 of the sinewave source 211. The second terminals of the coupling capacitors 223, 225 are coupled to the input of a rectifier/filter module 227 which also may be of conventional design such as the rectifier/filter module 20 of FIG. 2.

Further rectifier/filter modules and associated coupling capacitors can be coupled to the output lines 213, 215, as illustrated by the $N^{th}$ pair of coupling capacitors 229, 231 and the associated $N^{th}$ rectifier/filter module 233.

In the high voltage rectifying power supply 30 of FIG. 3, each of the rectifier/filter modules is coupled to the output of the sinewave source 211 via respective coupling capacitors.

The outputs of the rectifier/filter modules 221, 227, 233 are coupled in series to provide a high voltage output $V_{out}$. Again assuming small losses in the coupling capacitors, the output voltage provided by the serially coupled rectifier/filter outputs is approximately two-thirds of N times the peak output voltage $V_p$ of the sinewave source 211.

Since the coupling capacitors in the power supply 30 are not serially coupled as to each other, more rectifier/filter modules can be utilized with the power supply 30 of FIG. 3 than with the power supply 10 of FIG. 1. Thus, the power supply 30 can provide for a greater step-up in voltage.

Figure 4:
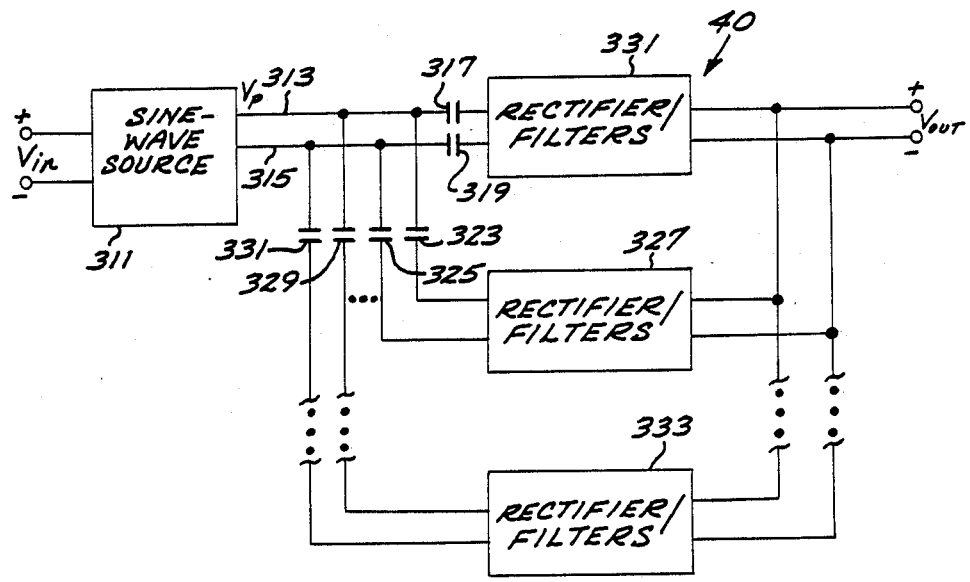
FIG. 4 is a block diagram of another rectifying power supply in accordance with the invention.

Referring now to FIG. 4, shown therein is a rectifying power supply 40 which may be utilized to provide lower voltages with high current. Specifically, power supply 40 is similar to the power supply 30 of FIG. 3, except that the outputs of the rectifier/filter modules of the power supply 40 are coupled in parallel. The output voltage provided by the power supply 40 is approximately two-thirds the peak output voltage $V_p$ provided by the sinewave source 311. The available current will be high as a result of the parallel configuration of the outputs of the rectifier/filter modules.

The following are examples of operating parameters and component values for the power supply 10 of FIG. 1, where the $F_s$ is the frequency of the output of the sinewave source 11 which has a peak voltage $V_p$:

$V_{in}$: 200 volts
$V_p$: 1200 volts
$F_s$: 2 MHz
$V_{out}$: 10.4 kilovolts
Total Power: 1 kilowatt
Capacitors 19, 21, 25, 27, 31, 33: 50,000 picofarads
Inductors 121, 123: 120 microhenrys
Diodes 111, 113, 115, 117: Type SPD524, Solid State Devices, La Mirada, Calif.
Filter Capacitor 119: 2,000 picofarads The following are examples of operating parameters and component values for the power supply 30 of FIG. 3, where the $F_s$ is the frequency of the output of the sinewave source 211 which has a peak voltage $V_p$:

$V_{in}$: 200 volts
$V_p$: 1200 volts
$F_s$: 2 MHz
$V_{out}$: 8.0 kilovolts
Total Power: 4 kilowatts
Capacitors 217, 219, 223, 225, 229, 231: 50,000 picofarads Inductors 121, 123: 24 microhenrys
Diodes 111, 113, 115, 117: Type SPD524, Solid State Devices, La Mirada, Calif.
Filter Capacitor 119: 13,000 picofarads
Number of rectifier/filter modules: 10

The following are examples of operating parameters and component values for the power supply 40 of FIG. 4, where the $F_s$ is the frequency of the output of the sinewave source 311 which has a peak voltage $V_p$:

$V_{in}$: 30 volts
$V_p$: 7.5 volts
$F_s$: 10 MHz
$V_{out}$: 5 volts
Total Power: 7.5 watts
Capacitors 317, 319, 323, 325, 329, 331: 50,000 picofarads
Inductors 121, 123: 24 microhenrys
Diodes 111, 113, 115, 117: Type 31DQ03, International Rectifier, El Segundo, Calif.
Filter Capacitor 119: 0.025 microfarads
Number of rectifier/filter modules: 5

While the foregoing power supply structures have been discussed as stand-alone circuits, it should be readily appreciated that they can comprise modular building blocks which can be connected in series or parallel to achieve the desired voltage and/or current outputs.

The foregoing has been a disclosure of a rectifying power supply structure which eliminates the need for an expensive and complex transformer, operates at frequencies greater than 1 MHz, and provides other distinct advantages. Such other advantages include uncomplicated design with predictable response, adaptability for a modular structure, adaptability for use as compact, inexpensive building blocks, which reduces cost in both development and manufacturing. Other advantages include low stored energy in the power supply, and faster open loop response for regulated power supply applications. Still further advantages include reduced size and weight, and increased efficiency and reliability. Finally, since the limitations of high voltage transformers do not come into play, the disclosed invention allows for AC operating frequencies substantially higher than what is presently practical.

Although the foregoing has been a description and illustration of specific embodiments of the invention, various modifications and changes thereto can be made by persons skilled in the art without departing from the scope and spirit of the invention as defined by the following claims.

What is claimed is:

1. A power supply comprising:
    means for providing AC power at a frequency greater than one megahertz;
    non-resonant means responsive to said AC power for providing DC isolation and for providing capacitively coupled AC power without inductors or resistors; and
    a plurality of rectifying means responsive to said capacitively coupled Ac power for providing respective DC outputs.

2. The power supply of claim 1 wherein said non-resonant means comprises a plurality of serially coupled capacitors, and wherein said plurality of rectifying means are connected to respectively associated ones of said capacitors.

3. The power supply of claim 2 further including other rectifying means non-capacitively coupled and directly connected to said AC power providing means for providing a DC output.

4. The power supply of claim 3 wherein said DC outputs of said plurality of rectifying means and said other rectifying means are serially connected.

5. The power supply of claim 1 wherein each of said plurality of capacitors is directly connected to said AC providing means and wherein each of said rectifying means is respectively associated with certain ones of said plurality of capacitors.

6. The power supply of claim 5 wherein said DC outputs of said plurality of rectifying means are serially connected.

7. The power supply of claim 5 wherein said DC outputs of said plurality of rectifying means are connected in parallel.

* * * * *